(12) United States Patent
Inoue et al.

(10) Patent No.: US 11,952,046 B2
(45) Date of Patent: Apr. 9, 2024

(54) VEHICLE BODY

(71) Applicants: TOYOTA JIDOSHA KABUSHIKI KAISHA, Toyota (JP); SUBARU CORPORATION, Tokyo (JP)

(72) Inventors: Shin Inoue, Okazaki (JP); Katsuya Ooshima, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 105 days.

(21) Appl. No.: 17/668,862

(22) Filed: Feb. 10, 2022

(65) Prior Publication Data
US 2022/0315129 A1 Oct. 6, 2022

(30) Foreign Application Priority Data
Mar. 31, 2021 (JP) .................. 2021-060474

(51) Int. Cl.
*B62D 25/20* (2006.01)
*B60R 13/10* (2006.01)
*B62D 29/00* (2006.01)

(52) U.S. Cl.
CPC ............. *B62D 25/20* (2013.01); *B60R 13/10* (2013.01); *B60R 13/105* (2013.01); *B62D 29/007* (2013.01)

(58) Field of Classification Search
CPC ...... B62D 25/20; B62D 29/007; B60R 13/10; B60R 13/105

USPC ......................................................... 296/204
See application file for complete search history.

(56) References Cited

U.S. PATENT DOCUMENTS

| | | | | |
|---|---|---|---|---|
| 7,455,877 B2* | 11/2008 | Rodriguez | ............. | B05D 5/061 427/272 |
| 8,052,205 B2* | 11/2011 | Matsuyama | ....... | B62D 25/2036 296/193.07 |
| 8,727,411 B2* | 5/2014 | Myszkowski | .......... | B60N 3/042 296/1.08 |
| 9,381,952 B2* | 7/2016 | Furusaki | ............. | B62D 25/2018 |
| 2013/0152439 A1 | 6/2013 | Myszkowski | | |
| 2018/0001841 A1* | 1/2018 | Jin | ....................... | B60R 13/0275 |

FOREIGN PATENT DOCUMENTS

| | | |
|---|---|---|
| CN | 2923436 Y | 7/2007 |
| JP | 2020-026232 A | 2/2020 |
| KR | 10-2005-0034295 A | 4/2005 |

* cited by examiner

*Primary Examiner* — Amy R Weisberg
*Assistant Examiner* — Dana D Ivey
(74) *Attorney, Agent, or Firm* — Sughrue Mion, PLLC

(57) ABSTRACT

A vehicle body includes a cross member that is provided on a floor panel and has a hole, and a nameplate that is joined to an inner face of the cross member. At least a part of the nameplate is exposed from the hole. A hardness of the nameplate is lower than a hardness of the steel plate used in the cross member, and a vehicle identification number is stamped in an area of the nameplate, the area being exposed from the hole.

6 Claims, 3 Drawing Sheets

VEHICLE BODY

CROSS-REFERENCE TO RELATED APPLICATION

This application claims priority to Japanese Patent Application No. 2021-060474 filed on Mar. 31, 2021, incorporated herein by reference in its entirety.

BACKGROUND

1. Technical Field

The technology in the disclosure relates to a vehicle body. In particular, the technology in the disclosure relates to a vehicle body in which a vehicle identification number is stamped on a cross member.

2. Description of Related Art

A vehicle body includes a floor panel and a cross member provided on the floor panel. Japanese Unexamined Patent Application Publication No. 2020-26232 (JP 2020-26232 A) discloses an example of a vehicle body having a floor panel and a cross member.

SUMMARY

Collision safety required of vehicle bodies is increasing with every passing year, and harder steel plates than conventional steel plates are being used in cross members. Vehicle identification numbers are stamped on cross members. Stamping on a cross member made of a hard steel plate requires improved performance of a stamping machine. Using a high-performance stamping machine increases the costs of stamping.

The disclosure provides a vehicle body that makes it possible to restrain increase in costs of stamping a vehicle identification number, while using a steel plate having a high hardness in a cross member. A structure in which a plate (nameplate) with a vehicle identification number stamped thereon is fixed on a cross member enables easy replacement of the nameplate at a later time. That is to say, forgery of a vehicle identification number is facilitated. The disclosure also provides a structure that makes it difficult to forge a vehicle identification number.

A vehicle body according to an aspect of the disclosure includes a cross member and a nameplate. The cross member is provided on a floor panel and has a hole. The nameplate is joined to an inner face of the cross member, at least a part of the nameplate being exposed from the hole. A hardness of the nameplate is lower than a hardness of a steel plate used in the cross member, and a vehicle identification number is stamped in an area of the nameplate, the area being exposed from the hole. With the vehicle body according to the aspect, the vehicle identification number can be stamped on the nameplate having a hardness lower than that of the steel plate of the cross member. Accordingly, the vehicle identification number can be stamped by a conventional-performance stamping machine. Increase in costs of stamping the vehicle identification number can be restrained while a steel plate having a high hardness is used in the cross member.

The nameplate is joined to the inner face of the cross member, and accordingly cannot be readily removed. That is to say, the nameplate cannot be replaced with another nameplate on which another vehicle identification number is stamped. The vehicle body according to the aspect can curb forgery of the vehicle identification number.

A closed space may be defined by the floor panel and the cross member. Thus, the nameplate cannot be removed from below the cross member.

The cross member may include a middle portion located in a middle in a width direction of the vehicle body, and an extension portion having one end that overlaps the middle portion and another end that is linked to a rocker. In this case, the nameplate may be joined to a portion at which the middle portion and the extension portion overlap each other. This makes removal of the nameplate even more difficult.

The nameplate may include a seat portion with a flat top face, and the seat portion may be exposed from the hole of the cross member. The level difference between the edge defining the hole of the cross member and the nameplate is thus reduced, and accordingly appearance is improved.

The details of the technology disclosed herein and further improvements thereof will be described below in the "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
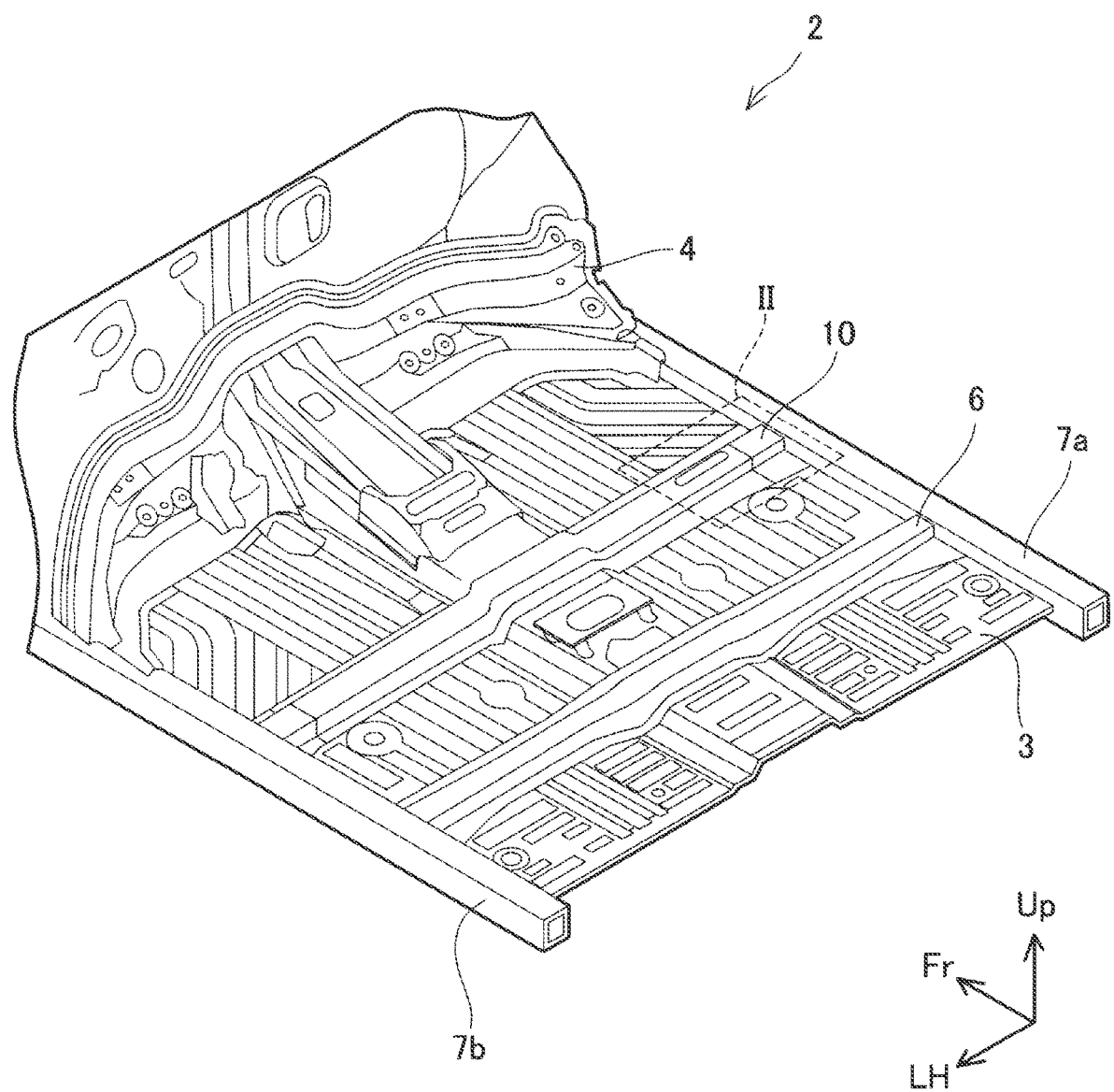
FIG. 1 is a perspective view of a vehicle body.

A vehicle body 2 according to an embodiment will be described with reference to the drawings. FIG. 1 is a perspective view of a part of the vehicle body 2. Note that "Fr", "LH", and "Up" in the coordinate system in FIG. 1 indicate forward, leftward, and upward with respect to the vehicle body 2, respectively. The meanings of the axes of the coordinate system are also the same in the following drawings as well.

The vehicle body 2 includes a floor panel 3, a dash panel 4, a pair of rockers 7a and 7b, and cross members 6 and 10. The floor panel 3 corresponds to a floor of a cabin. The dash panel 4 is a partitioning plate between the cabin and a front compartment. The rockers 7a and 7b are beams extending in the front-rear direction on the lower side of the vehicle body 2. The right end and the left end of the floor panel 3 are linked to the respective rockers 7.

The cross members 6 and 10 are beams extending in the width direction of the vehicle body. The cross members 6 and 10 are provided on the floor panel 3. One end of each of the cross members 6 and 10 is linked to the rocker 7a, and the other end of each of the cross members 6 and 10 is linked to the rocker 7b. FIG. 1 is a partial perspective view of portions in the vicinity of front seats. In FIG. 1, the front seats (omitted from illustration) are fixed on the two cross members 6 and 10. The cross member 10 supports the lower parts of the front seats at the front side, and the cross member 6 supports the lower parts of the front seats at the rear side.

Figure 2:
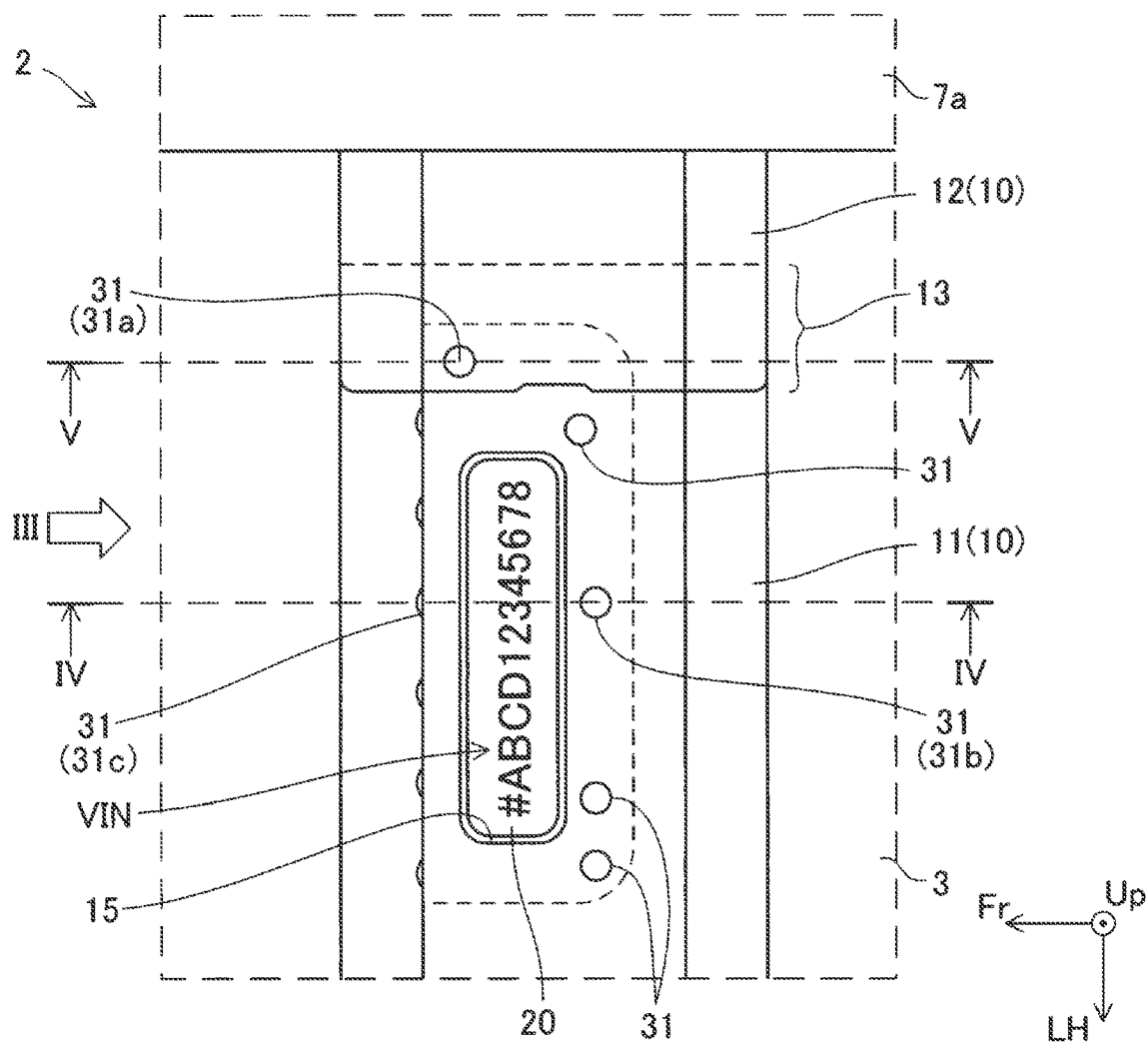
FIG. 2 is a plan view of an area indicated by the broken line II in FIG. 1.
Figure 3:
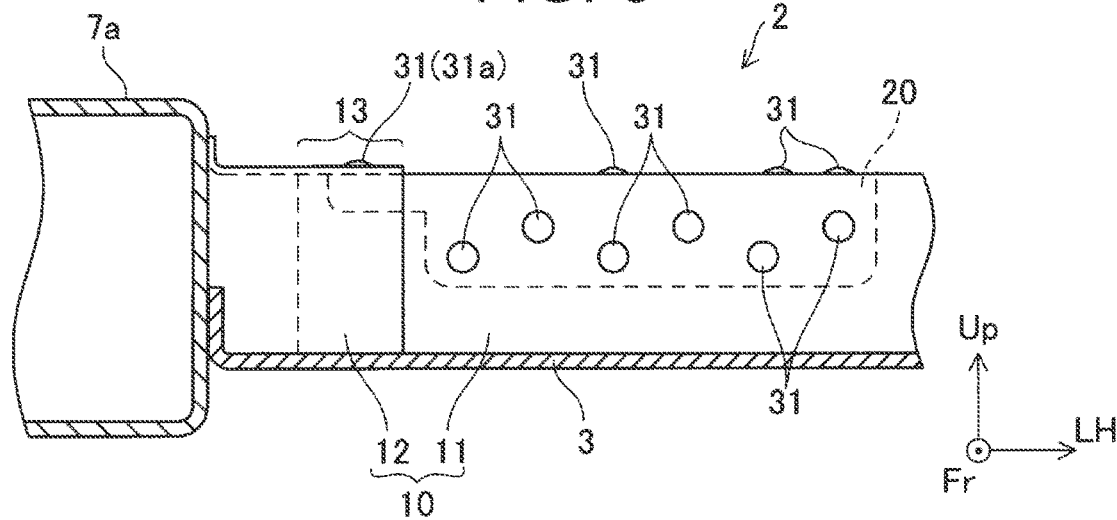
FIG. 3 is a front view of the vehicle body as viewed from the direction of arrow III in FIG. 2.

FIG. 2 is a plan view of an area indicated by the broken line II in FIG. 1. Also, FIG. 3 is a front view, as viewed in the direction of arrow III in FIG. 2. FIGS. 2 and 3 illustrate a linking portion of the cross member 10 and the rocker 7a and the vicinity of the linking portion.

A vehicle identification number is required by law to be affixed to the cross member 10. A hole 15 is provided in the upper face of the cross member 10. At least a part of a nameplate 20 is exposed from the hole 15, and the vehicle identification number VIN is stamped on the nameplate 20. Although the nameplate 20 covers the hole 15 from the inner side (inner side of the cross member 10), there may be a gap between the edge defining the hole 15 and the edge of the nameplate 20. The vehicle identification number VIN is stamped in the area exposed from the hole 15 of the nameplate 20. As illustrated in FIG. 2, the vehicle identification number VIN of the vehicle body 2 according to the embodiment is "#ABCD12345678". The vehicle identification number VIN shown in FIG. 2 is an example.

A material having a hardness (Vickers hardness) lower than a hardness of the steel plate used in the cross member 10 is used in the nameplate 20. The reason why a material having a hardness lower than that of the steel plate of the cross member 10 is used in the nameplate 20 will be described later.

The cross member 10 is a beam that is a rectangular tube, with the nameplate 20 being joined to an inner face of the cross member 10. In FIGS. 2 and 3, portions of the nameplate 20 that are hidden by the cross member 10 are drawn by a broken line. The nameplate 20 is joined to the inner face of the cross member 10 at a plurality of welding spots 31.

The cross member 10 includes a middle portion 11 located in the middle in the width direction of the vehicle body and an extension portion 12 having one end overlapping the middle portion 11 and the other end linked to the rocker 7a. An area indicated by reference numeral 13 in FIGS. 2 and 3 is an area (overlapping area 13) in which the middle portion 11 and the extension portion 12 overlap each other. A welding spot 31a is located in the overlapping area 13. That is to say, the nameplate 20 is joined to the area (overlapping area 13) in which the middle portion 11 and the extension portion 12 overlap each other.

Figure 4:
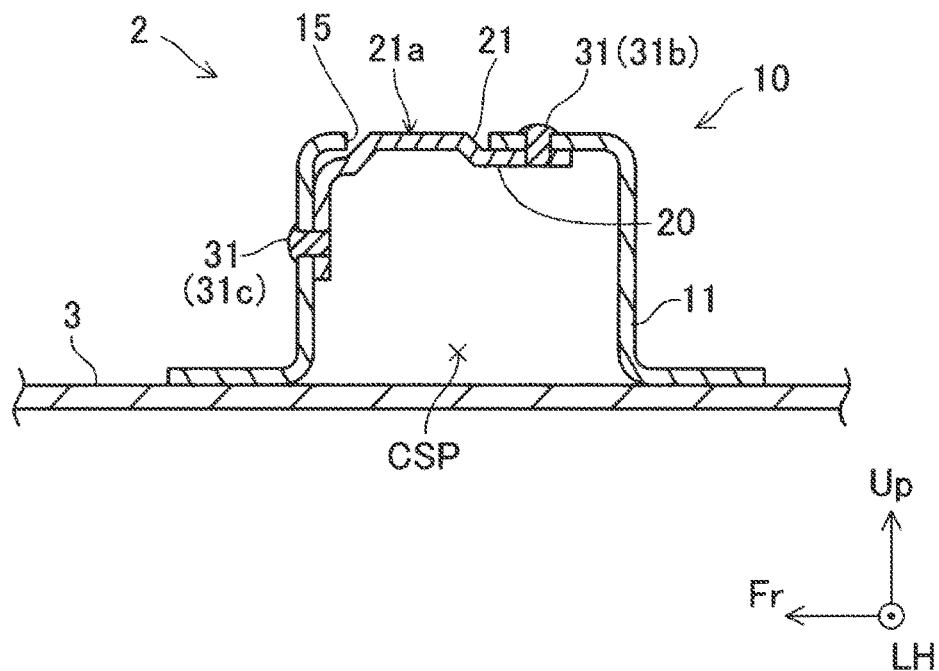
FIG. 4 is a sectional view of the vehicle body, taken along line IV-IV in FIG. 2.
Figure 5:
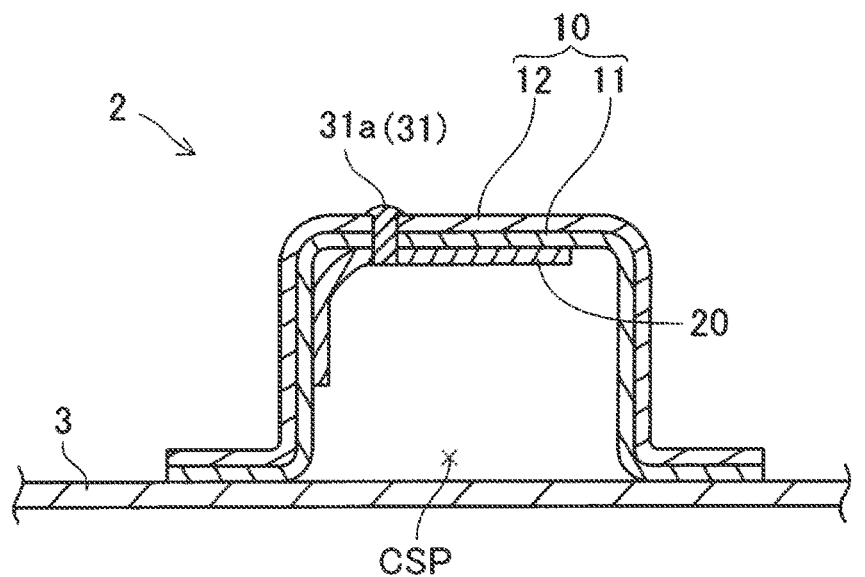
FIG. 5 is a sectional view of the vehicle body, taken along line V-V in FIG. 2.

FIG. 4 is a sectional view of the vehicle body 2, taken along line IV-IV in FIG. 2, and FIG. 5 is a sectional view of the vehicle body 2, taken along line V-V in FIG. 2. FIG. 4 illustrates a section of the vehicle body 2, taken along a plane passing through the hole 15 and welding spots 31b and 31c, and FIG. 5 illustrates a section of the vehicle body 2 taken along a plane passing through the welding spot 31a. FIG. 5 illustrates a section of the cross member 10 taken in the overlapping area 13 of the middle portion 11 and the extension portion 12.

As illustrated in FIGS. 4 and 5, the rectangular tubular cross member 10 is welded onto the floor panel 3, and the floor panel 3 and the cross member 10 form (define) a closed space CSP.

As illustrated in FIG. 4, the nameplate 20 has a seat portion 21 having a flat top face 21a. In other words, the seat portion 21 is a protruding portion having a flat top face 21a. The seat portion 21 is exposed from the hole 15 of the cross member 10, and the vehicle identification number VIN is stamped on the flat top face 21a. The flat top face 21a of the seat portion 21 is flush with the upper face of the cross member 10. Since the seat portion 21 is provided in the nameplate 20, the level difference between the edge defining the hole 15 of the cross member 10 and the nameplate 20 (flat top face 21a) is reduced. Accordingly appearance is improved.

At the welding spots 31b and 31c, the middle portion 11, the extension portion 12, and the nameplate 20 are welded together. The nameplate 20 is joined to the cross member 10 at the plurality of welding spots 31. The nameplate 20 is joined to the reverse face of the upper face of the cross member 10, and also to the reverse face of the side face of the cross member 10.

The advantages of the vehicle body 2, and the advantages attributable to the structure of the cross member 10 and the nameplate 20 in particular, will be described. In order to increase the strength of the vehicle body 2, a steel plate having a high hardness is used in the cross member 10. As another factor, a vehicle identification number VIN is required by law to be stamped on the cross member 10. Stamping identification numbers on hard steel plates requires an expensive stamping machine. That is to say, using a hard steel plate in the cross member 10 increases the costs of stamping the vehicle identification number VIN. Accordingly, in the vehicle body 2, the nameplate 20 that has a lower hardness is attached to a part of the cross member 10, and the vehicle identification number VIN is stamped on the nameplate 20. Alternatively, the nameplate 20 on which the vehicle identification number VIN is stamped is joined to the cross member 10. Since the vehicle identification number VIN is stamped on the nameplate 20 that has a lower hardness, an expensive stamping machine is not necessary, and increase in costs for stamping can be restrained.

A part of the nameplate 20 (seat portion 21) is exposed from the hole 15 of the cross member 10, and the remaining portion (around the seat portion 21) is joined to the inner face of the cross member 10. The portion around the seat portion 21 is joined to the inner face of the cross member 10, and accordingly the nameplate 20 cannot be readily removed from the cross member 10. The structure of the vehicle body 2 can curb forgery of the vehicle identification number VIN. In particular, the cross member 10 includes the middle portion 11 and the extension portion 12 (the cross member 10 is divided into the middle portion 11 and the extension portion 12), and the nameplate 20 is welded together with the middle portion 11 and the extension portion 12. As illustrated in FIG. 5, the welding spot 31a joins the middle portion 11, the extension portion 12, and the nameplate 20 together. Attempting to remove the nameplate 20 from the cross member 10 destroys the joining portion of the middle portion 11 and the extension portion 12, thereby disassembling the cross member 10. This structure also makes removal of the nameplate 20 more difficult. That is to say, this structure also contributes to curbing forgery of the vehicle identification number VIN.

Points to be noted regarding the technology described in the embodiment will be described. The nameplate 20 on which the vehicle identification number VIN is stamped is joined to the cross member 10 that supports the front portions of the front seats. The nameplate 20 may be attached to another cross member. The hole 15 from which at least a part of the nameplate 20 is exposed is provided in the upper face of the cross member 10. A hole from which at least a part of the nameplate 20 is exposed may be provided in the side face of the cross member 10.

While a specific embodiment of the disclosure has been described in detail above, the embodiment is merely exemplary, and does not limit the scope of the disclosure. The technology in the disclosure includes various modifications and alterations of the specific embodiment described above.

The technical element described herein or illustrated in the drawings demonstrates technical utility when used singly or in various combinations, which are not limited to the combinations defined in the embodiment. The technology described herein or illustrated in the drawings may achieve a plurality of objects at the same time, and has technical utility by achieving one of the objects by itself.

What is claimed is:

1. A vehicle body comprising:
   a cross member that is provided on a floor panel and has a hole; and
   a nameplate that is joined to an inner face of the cross member, at least a part of the nameplate being exposed from the hole, wherein:
   a hardness of the nameplate is lower than a hardness of a steel plate used in the cross member; and
   a vehicle identification number is stamped in an area of the nameplate, the area being exposed from the hole;
   wherein the nameplate is joined to the inner face of the cross member such that attempted removal of the nameplate from the inner face of the cross member would destroy structural integrity of the cross member.

2. The vehicle body according to claim 1, wherein a closed space is defined by the floor panel and the cross member.

3. The vehicle body according to claim 1, wherein:
   the cross member includes a middle portion located in a middle in a width direction of the vehicle body, and an extension portion having one end that overlaps the middle portion and another end that is linked to a rocker; and
   the nameplate is joined to a portion at which the middle portion and the extension portion overlap each other.

4. The vehicle body according to claim 1, wherein the nameplate includes a seat portion with a flat top face, and the seat portion is exposed from the hole.

5. The vehicle body according to claim 4, wherein the flat top face of the seat portion is flush with an upper face of the cross member.

6. The vehicle body according to claim 1, wherein an entirety of the vehicle identification number is exposed from the hole.

* * * * *